United States Patent
Fauteux et al.

(10) Patent No.: US 6,268,080 B1
(45) Date of Patent: Jul. 31, 2001

(54) PROCESS FOR CONDITIONING AN ELECTROCHEMICAL CELL

(75) Inventors: Denis G. Fauteux; Eric S. Kolb, both of Acton, MA (US)

(73) Assignee: Mitsubishi Chemical Corporation (JP)

( * ) Notice: Subject to any disclaimer, the term of this patent is extended or adjusted under 35 U.S.C. 154(b) by 0 days.

(21) Appl. No.: 09/362,945

(22) Filed: Jul. 28, 1999

(51) Int. Cl.$^7$ ...................................................... H01M 6/18

(52) U.S. Cl. ........................... 429/188; 429/305; 429/303; 429/306; 429/307; 429/322; 429/324; 429/231.95

(58) Field of Search ................................ 429/231.95, 188, 429/303, 305, 306, 307, 322, 324

(56) References Cited

U.S. PATENT DOCUMENTS

| | | | |
|---|---|---|---|
| 5,846,673 | * 12/1998 | Saidi et al. | 429/195 |
| 5,853,917 | * 12/1998 | Fauteux et al. | 429/194 |
| 5,861,224 | * 1/1999 | Barker et al. | 429/194 |

* cited by examiner

*Primary Examiner*—Carol Chaney
*Assistant Examiner*—Angela J. Martin
(74) *Attorney, Agent, or Firm*—Factor & Partners

(57) ABSTRACT

A process for conditioning an electrochemical cell comprising the steps of fabricating an electrochemical cell comprising a first electrode, a second electrode, and an electrolyte, associating an additive with the electrochemical cell, elevating the temperature of the electrochemical cell, and cycling the electrochemical cell, and in turn, forming a passivation layer at an interface between one of the electrodes and the electrolyte.

7 Claims, 2 Drawing Sheets

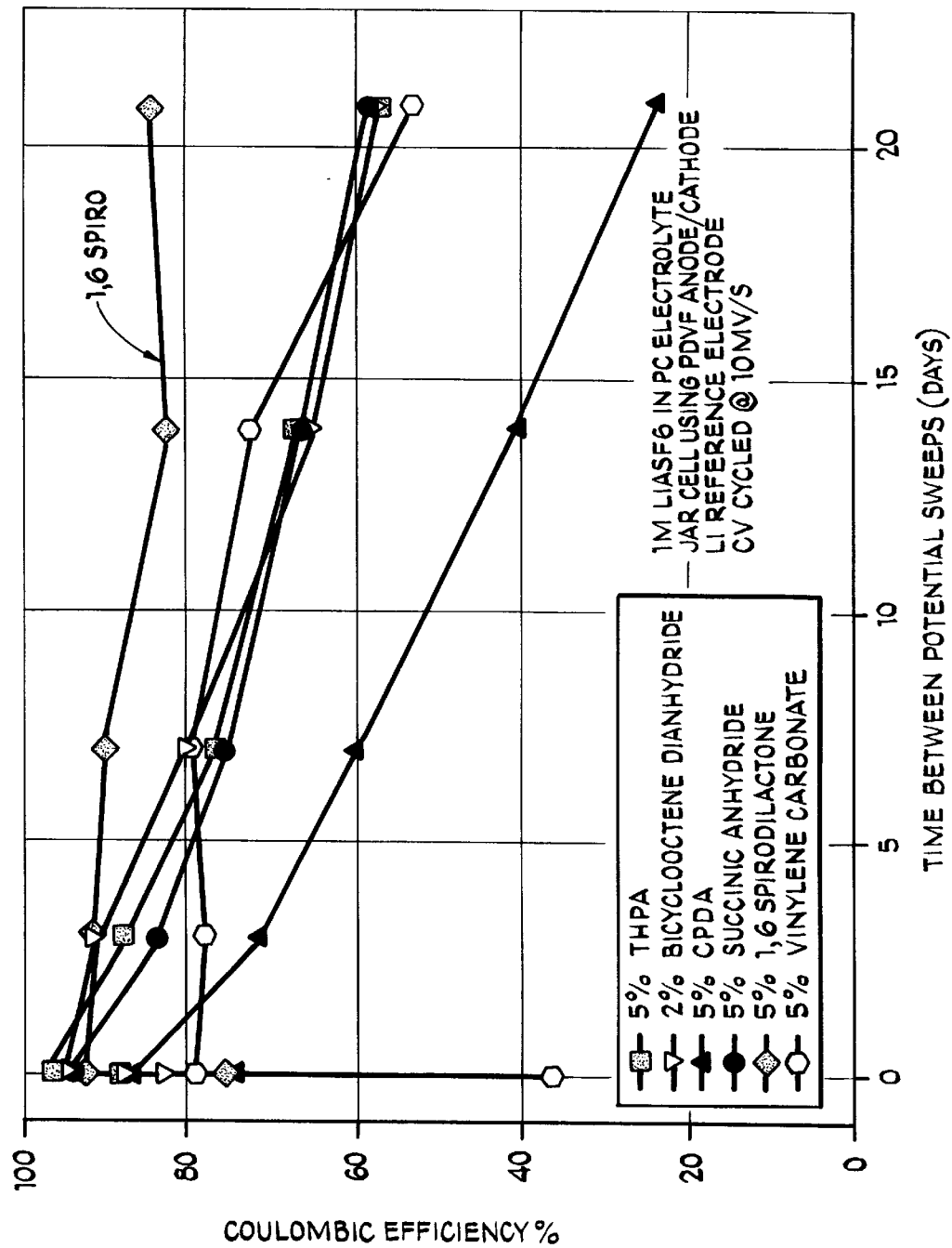

PROCESS FOR CONDITIONING AN ELECTROCHEMICAL CELL

BACKGROUND OF THE INVENTION

1. Field of the Invention

The present invention relates in general to electrochemical cells, and more particularly, to a process for conditioning an electrochemical cell in the presence of an additive at elevated temperatures.

2. Background Art

Conventional electrochemical cells are conditioned, prior to normal use, by cycling (i.e. charging and discharging) the electrochemical cell several times in a controlled fashion. During conditioning of the of the electrochemical cell, a solid electrolyte interface (SEI) or passivation layer is formed. The formation of the passivation layer occurs when an electrolyte component, such as an additive undergoes one or more chemical changes including reduction or decomposition. Once a stable passivation layer has been formed the electrochemical cell can be cycled, or put into normal operation, in a safe and reliable manner.

While a passivation layer serves a valuable purpose during operation of an electrochemical, the conventional process used to form the passivation layer is not without its drawbacks. First, in order to properly form the passivation layer the cell must be cycled several times, which increases conditioning time and overall cost of manufacturing the cell. Second, a portion of the cell's capacity is consumed during the formation of the passivating layer, which directly results in a loss of energy density of the cell.

It is therefore an object of the present invention to provide a process for conditioning an electrochemical cell that remedies the aforementioned complications and/or detriments associated with conventional conditioning techniques.

SUMMARY OF THE INVENTION

The present invention is directed to a process for conditioning an electrochemical cell comprising the steps of: (a) fabricating an electrochemical cell comprising a first electrode, a second electrode, and an electrolyte; (b) associating an additive with the electrochemical cell; (c) elevating the temperature of the electrochemical cell; and (d) cycling the electrochemical cell, and in turn, forming a passivation layer at an interface between one of the electrodes and the electrolyte.

In a preferred embodiment of the invention, the step of elevating the temperature of the electrochemical cell comprises the step of heating the cell to between approximately 45 degrees centigrade and approximately 100 degrees centigrade.

In another preferred embodiment of the invention, the step of elevating the temperature of the electrochemical cell comprises the step of heating the cell to between approximately 65 degrees centigrade and approximately 85 degrees centigrade.

The step of associating an additive with the electrochemical cell preferably comprises the step of introducing an additive selected from at least one of the group consisting essentially of THPA, bicyclo-octene dianhydride, CPDA, succinic anhydride, 1,6-spiro, vinylene carbonate and mixtures thereof into the electrolyte.

Preferably the process further includes the step of increasing the coulombic efficiently of the electrochemical cell relative to an electrochemical cell cycled at ambient temperature.

In a preferred embodiment of the invention, the step of fabricating the electrochemical cell comprises the steps of: (a) associating a carbonaceous electrode with a lithium transition metal oxide electrode; and (b) positioning an organic solvent with between the electrodes.

BRIEF DESCRIPTION OF THE DRAWINGS

The invention will now be described with reference to the drawings wherein:

FIG. 2 is a two-dimensional graph showing coulombic efficiency as a function of time for various electrochemical cells conditioned in the presence of an additive at 70 degrees centigrade.

BEST MODE FOR PRACTICING THE INVENTION

Figure 1:
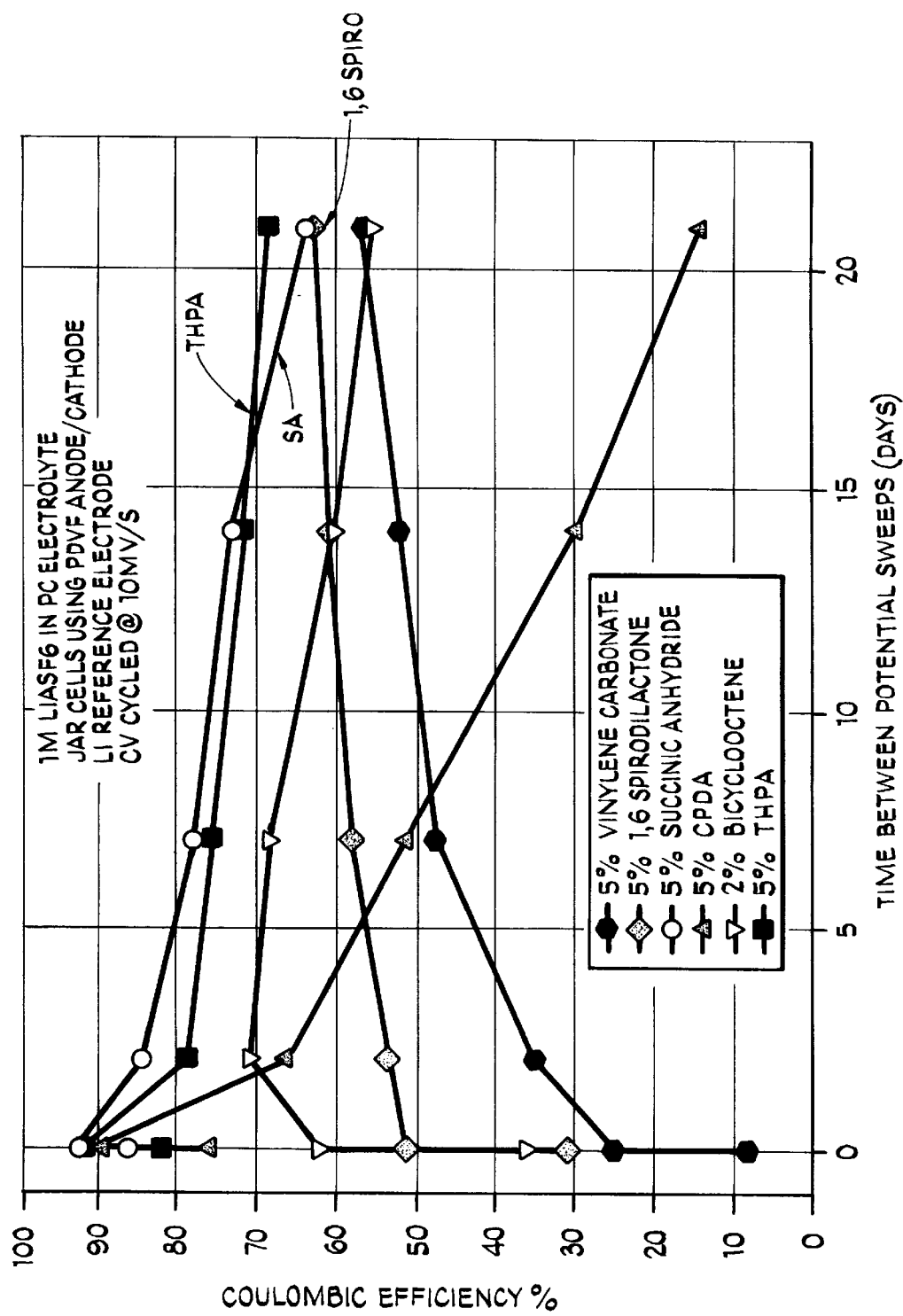
FIG. 1 is a two-dimensional graph showing coulombic efficiency as a function of time for various electrochemical cells conditioned in the presence of an additive at ambient temperature.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Conventional, prior art electrochemical cell conditioning processes associate an additive with the cell and then cycle the cell at ambient temperature. The problem with this type of process is that the rate at which the passivation layer forms is quite slow—thereby requiring several charge/discharge cycles to properly condition the cell. As previously discussed, a portion of the cell's capacity is lost during formation of the passivation when using conventional conditioning techniques.

The present invention, on the other hand, is directed to a process for conditioning an electrochemical cell in such a way so as to increase the rate of formation of the passivation layer so that fewer conditioning cycles are necessary and so that less of the cell's capacity is consumed during the conditioning process. The process in accordance with the present invention comprises the following steps:

First, an electrochemical cell is fabricated using conventional techniques. It will be understood that the electrochemical cell may comprise a first electrode (an anode), a second electrode (a cathode), and an electrolyte. The first electrode preferably includes a carbonaceous active material, such as carbon black or graphite, which is applied to a copper current collector. The second electrode preferably includes an active material layering comprising a lithium transition metal oxide, such as $LiNiO_2$, $LiCoO_2$, $LiMn_2O_4$ and mixtures thereof, which is applied to an aluminum current collector. The electrolyte typically includes a salt, such as $LiAsF_6$ or $LiBF_4$ dissolved in, for example, propylene carbonate (PC), ethylene carbonate (EC), diethyl carbonate (DEC), and/or dimethyl carbonate (DMC).

Second an additive is associated with the electrochemical cell. For purposes of the present disclosure the additive may comprise 1,6-dioxaspiro[4.4]nonane-2-7 dione (hereinafter 1,6-spiro) and/or 1,4-dioxaspiro[4.5]decane-2-one (hereinafter 1,4-spiro) as disclosed in U.S. Pat. No. 5,853,917, the entirety of which is incorporated herein by reference, or those represented by the following chemical structures:

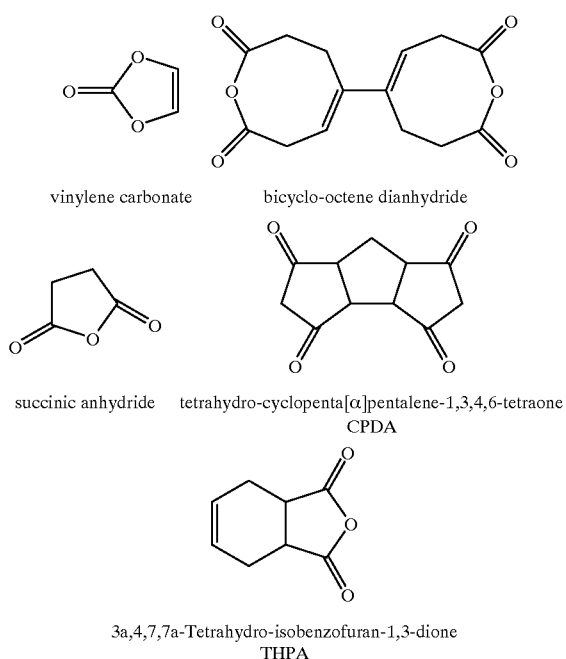

vinylene carbonate  bicyclo-octene dianhydride succinic anhydride  tetrahydro-cyclopenta[α]pentalene-1,3,4,6-tetraone
CPDA 3a,4,7,7a-Tetrahydro-isobenzofuran-1,3-dione
THPA Once the additive has been associated with the electrochemical cell, the cell is heated above ambient temperature by, for example, a conventional heat source including a conduction, convection, and/or radiation heat source. While the precise heating temperature can vary greatly, it will be understood that a general range of between approximately 45 degrees centigrade and approximately 100 degrees centigrade is suitable for use. A preferred temperature range includes heating to between approximately 65 degrees centigrade and approximately 85 degrees centigrade.

After the electrochemical cell has been heated above ambient temperature, the electrochemical cell is cycled according to a convention protocol or operating procedure. Typically the battery will be cycled between, for example, 2.5–4.3 volts. As will be discussed in greater detail below, an electrochemical cell that is cycled at elevated temperatures exhibits an increase in the formation rate of the passivation layer, and in turn, an increase in coulombic efficiency relative to a cell having an additive conditioned at ambient temperature.

In support of the present invention, the following experiments were conducted using the following common test procedure. First electrochemical cells were fabricated wherein the working electrode comprised carbon in a PVDF binder which was applied to a copper foil current collector. The counter electrode was $LiCoO_2$ in a PVDF binder which was applied to an aluminum current collector. The electrolyte was a 1M solution of $LiAsF_6$ dissolved in PC. The reference electrode was lithium metal applied to a nickel strip. In all cases the additive was included in the electrolyte formulation. The identity and concentration of the additives are shown in the accompanying figures. Each cell was heated to 70 degrees centigrade and then conditioned using cyclic voltammetry, wherein the cells were cycled from 3 volts down to 0 volts in a stepped fashion. Parallel tests were run with analogously configured cell that were conditioned at ambient temperature. The test results are provided below in FIGS. 1 and 2.

FIG. 1 shows the coulombic efficiency for several cells using different additives that were conditioned at ambient temperature. FIG. 2 shows the comparative coulombic efficiency for cells conditioned at 70 degrees centigrade. As can be seen, several of the electrochemical cells conditioned in the presence of an additive at elevated temperatures exhibit greater coulombic efficiency than the analogous cells conditioned at ambient temperature.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. A process for conditioning an electrochemical cell comprising the steps of:
    fabricating an electrochemical cell comprising a first electrode, a second electrode, and an electrolyte;
    adding an additive to the electrolyte;
    elevating the temperature, prior to an initial cycling, of the electrochemical cell; and
    cycling the electrochemical cell, and in turn, forming a passivation layer at an interface between one of the electrodes and the electrolyte.

2. The process according to claim 1, wherein the step of elevating the temperature of the electrochemical cell comprises the step of heating the cell to between approximately 45 degrees centigrade and approximately 100 degrees centigrade.

3. The process according to claim 1, wherein the step of elevating the temperature of the electrochemical cell comprises the step of heating the cell to between approximately 65 degrees centigrade and approximately 85 degrees centigrade.

4. The process according to claim, 1 wherein the step of adding an additive to the electrochemical cell comprises the step of adding an additive selected from at least one of the group consisting essentially of THPA, bicyclo-octene dianhydride, CPDA, succinic anhydride, 1,6-spiro, vinylene carbonate, and mixtures thereof into the electrolyte.

5. The process according to claim 1, further comprising the step of increasing the coulombic efficiency of the electrochemical cell relative to an electrochemical cell cycled at ambient temperature.

6. The process according to claim 1, wherein the step of fabricating the electrochemical cell comprises the steps of:
    associating a carbonaceous electrode with a lithium transition metal oxide electrode; and
    introducing an organic solvent with between the electrodes.

7. An electrochemical cell conditioned according to the process of claim 1.

* * * * *